Figure 1:
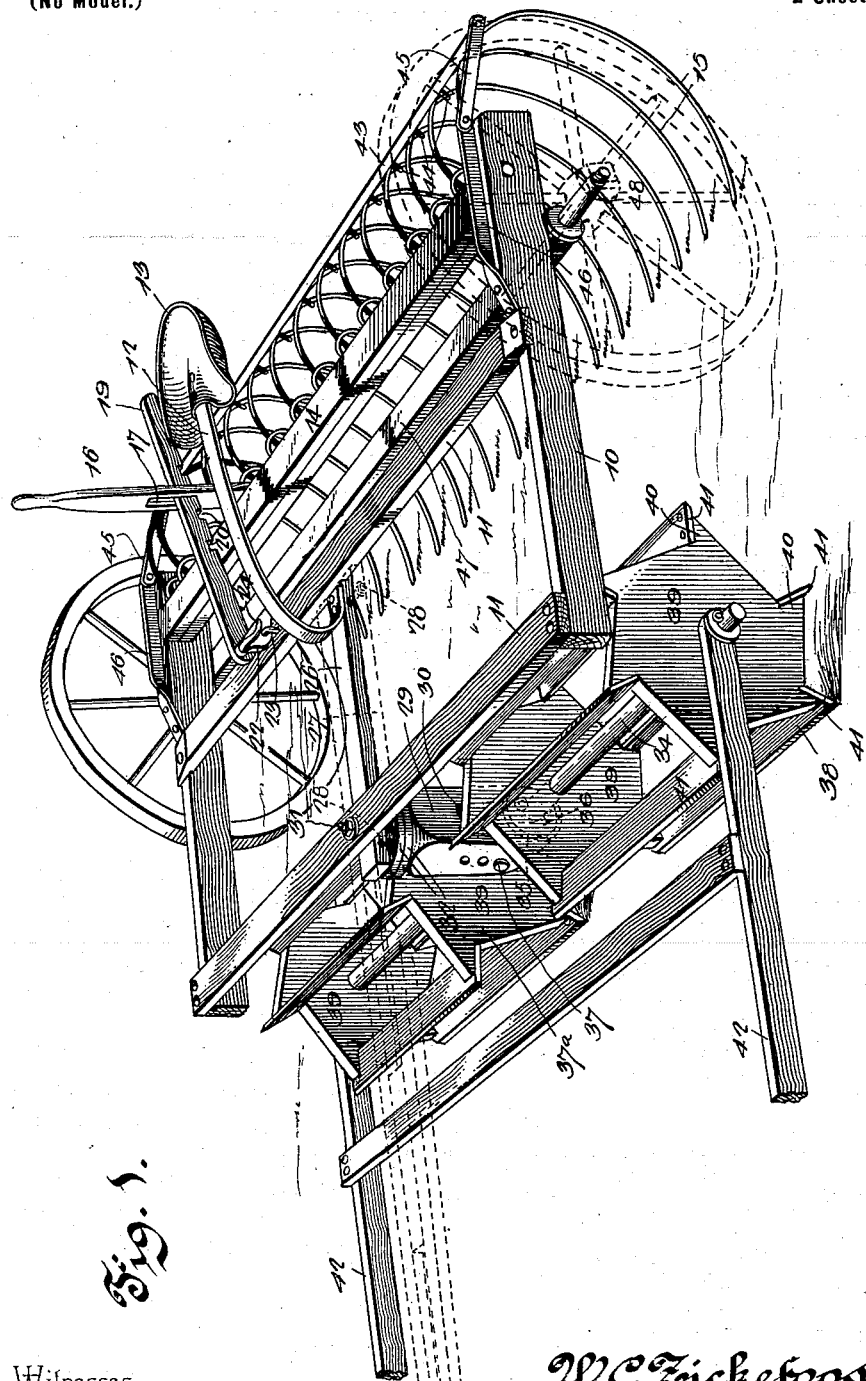

No. 647,782. Patented Apr. 17, 1900.
W. C. ZICKEFOOSE.
CONVERTIBLE HAY RAKE AND STALK CUTTER.
(Application filed Nov. 11, 1899.)

(No Model.) 2 Sheets—Sheet 1.

Witnesses
Frank Culverwell
H. F. Bernhof

W. C. Zickefoose, Inventor.
By his Attorneys,
C. A. Snow & Co.

No. 647,782. Patented Apr. 17, 1900.
W. C. ZICKEFOOSE.
CONVERTIBLE HAY RAKE AND STALK CUTTER.
(Application filed Nov. 11, 1899.)
(No Model.) 2 Sheets—Sheet 2.
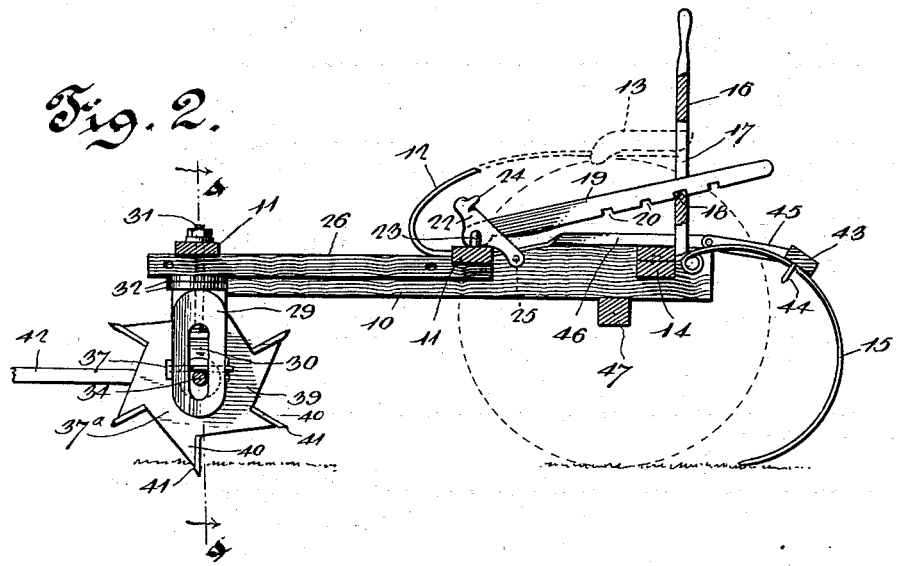
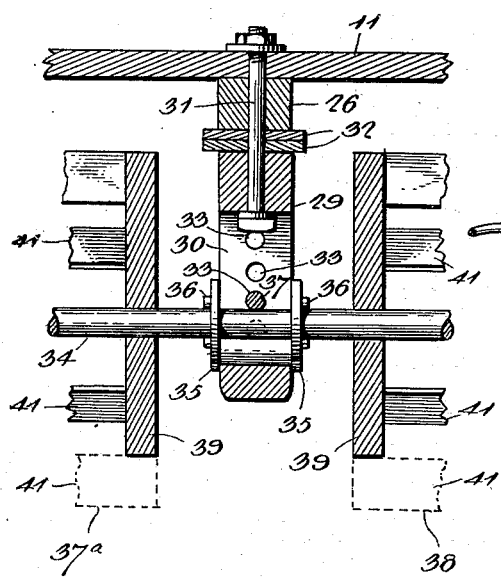
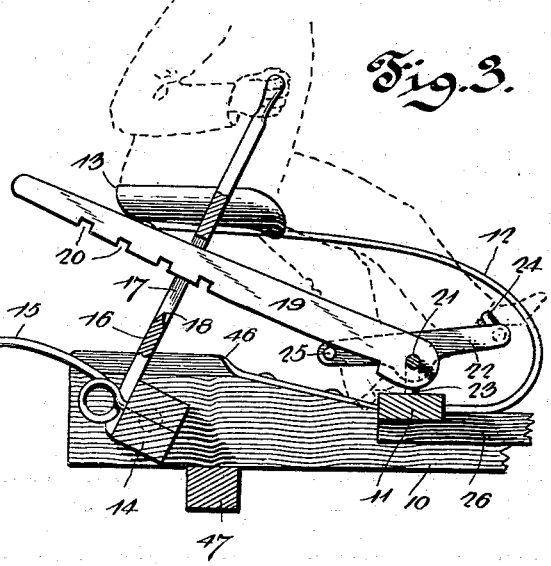

United States Patent Office.

WILLIAM C. ZICKEFOOSE, OF DES MOINES, IOWA.

CONVERTIBLE HAY-RAKE AND STALK-CUTTER.

SPECIFICATION forming part of Letters Patent No. 647,782, dated April 17, 1900.

Application filed November 11, 1899. Serial No. 736,615. (No model.)

*To all whom it may concern:*

Be it known that I, WILLIAM C. ZICKEFOOSE, a citizen of the United States, residing at Des Moines, in the county of Polk and State of Iowa, have invented a new and useful Convertible Hay-Rake and Stalk-Cutter, of which the following is a specification.

My invention relates to a convertible hay-rake and cornstalk-cutter; and the primary object is to provide an improved trip and locking mechanism for the hand-operable rake-adjusting lever whereby the driver may release the locking device by foot-pressure and operate the rake-adjusting lever by hand, thus leaving his hands free to drive the team.

A further object is to provide a simple machine by which the operation of raking hay and of cutting cornstalks may be carried out by a few changes in a single machine, thus saving the farmer the cost of two machines for the performance of the work separately.

With these ends in view the invention consists in the novel combination of devices and in the construction, arrangement, and adaptation of parts, as will be hereinafter fully described and claimed.

In the drawings, Figure 1 is a perspective view illustrating the complete machine with the exception of the draft-tongue which is used for drawing the machine when adjusted to serve as a rake, the tongue being shown by dotted lines. Fig. 2 is a longitudinal sectional elevation through the machine, omitting the draft appliances. Fig. 3 is an enlarged detail sectional elevation illustrating the operation of the trip for releasing the locking-bar from the rake-adjusting lever. Fig. 4 is an enlarged detail cross-section through a part of the stalk-cutter, the plane of the section being indicated by the dotted line 4 4 of Fig. 2.

The same numerals of reference are used to indicate like and corresponding parts in each of the several figures of the drawings.

10 designates the main frame, which is provided with the cross-bars 11, that brace the sides of said frame. A seat-spring 12 is secured firmly to one of these cross-bars, said spring carrying an ordinary driver's seat 13. The horizontal rake-head 14 is arranged across the main frame at the rear end thereof and is pivotally supported in any suitable way in the side rails. This rake-head carries a series of curved tines or teeth 15 of ordinary construction, and an adjusting-lever 16 is secured firmly to the rake-head at a point which disposes the free end of the lever within convenient reach of the driver occupying the seat. Said lever 16 is provided with a longitudinal slot 17, the lower edge of which is beveled to form a locking-tongue 18. (See Figs. 2 and 3.) A pivotal locking-bar 19 passes loosely through the slot of the rake-lever, and in the lower edge of this locking-bar is formed a series of notches 20, into any one of which may fit the locking-tongue of the rake-lever, according to the position of the rake-head and the lever attached thereto. This locking-bar extends forward beyond the rake-head, so as to be supported pivotally at 21 on one of the cross-bars 11 of the machine-frame, and the locking-bar is thus pivotally supported independently of the rake-head, so that it may be raised out of engagement with the rake-lever.

One of the important features of my invention consists in a foot-operated trip adapted to release the locking-bar from the rake-lever without requiring the driver to lay down the driving-reins, and to this end I employ a trip-treadle 22, which is mounted pivotally alongside of the pivoted end of the locking-bar. (See Figs. 2 and 3.) I prefer to employ a fixed bail 23 as a means for pivotally supporting the locking-bar and the foot-treadle, and this treadle is fulcrumed at a point intermediate of its length, thus leaving both ends of the treadle free. On the forward end of this treadle is secured or provided a foot piece or rest 24, and at the rear end of the treadle is a laterally-extending stud 25, arranged to fit beneath the locking-bar at a point in rear of its pivot. The foot-rest prevents the operator's foot from slipping on the treadle, and when pressure is applied to one end of the treadle the other end thereof and the stud is lifted in order that the stud may exert upward pressure against the pivotal locking-bar to move the notched edge thereof out of engagement with the locking-tongue on the rake-lever. The locking-bar is adapted to play freely in the slot of the rake-lever, so that the bar is confined in operative relation to the lever and its tongue 18, whereby the pivoted locking-bar is adapted to drop by gravity, when pressure is removed from the foot-treadle, for the purpose of making the tongue 18 enter one of the notches to lock the lever and rake in their adjusted position. It is evident that the operator may without releasing the driving-reins disengage the locking-bar from the rake-lever and adjust the rake to discharge the load or clear obstructions in the path of the machine.

In using my machine for raking hay the cornstalk-cutter mechanism is removed or disconnected and a draft-tongue (shown by dotted lines in Fig. 1) is bolted to the frame 10. This frame is provided with a central draft-bar 26, which terminates substantially at the front cross-rail 11. The draft-tongue for the rake-frame consists of two pieces 27, which are applied to opposite sides of the draft-bar 26, and are secured firmly, but removably, thereto by means of the bolts 28.

I will now proceed to describe the stalk-cutter mechanism, which is adapted to be used in connection with the frame of the rake; but I desire to premise that the draft-tongue 27 is detached from the rake-frame, and a three-horse draft appliance, to be presently described, is used in connection with the stalk-cutter and the machine.

One element of the stalk-cutter appliance is a hanger 29, which is provided with a longitudinal slot 30. This hanger is arranged in a vertical position beneath the front cross-rail 11 of the frame, and it is connected thereto by a vertical pin-bolt 31, the latter passing through the rail 11 and the upper part of the hanger. (See Fig. 4.) This bolt 31 forms a means for permitting removal of the hanger and the parts carried thereby when so desired. Washers 32 are fitted between the upper end of the hanger and the draft-bar 26 in order to space the hanger relative to the frame and to take up the wear between said hanger and the frame. The hanger is, furthermore, provided with a vertical series of transverse openings 33, which intersect with the slot 30, and through said slot extends the cutter-axle 34, the latter arranged in a substantially-horizontal position below the front part of the machine-frame 10. The axle is prevented from having endwise movement in the slot of the hanger by means of the washers 35, which are fitted on the axle to bear against opposite sides of the hanger, and said washers are retained in place by the keys 36, which are fastened to the axle. The position of the axle in the slotted hanger is determined by a limiting pin or bolt 37, which is fitted in one of the openings 33 to extend across the slot in the hanger and to lie above the axle. It is evident that this pin or bolt may be fitted in any one of the series of openings in order to determine the position of the cutter-axle with relation to the frame. The axle 34 extends for a considerable distance beyond opposite sides of the hanger, and it carries the two cutters 37ª 38. Each cutter consists of a pair of heads 39, having their edges recessed to form the tongues 40, to which are firmly secured the blades 41. The cutters formed by the pairs of heads and the blades are secured to the axle to rotate therewith, and this cutter mechanism is adapted to rest upon the ground and to rotate on the advance of the machine, whereby the blades are presented to the stalks in order to cut the latter as the revoluble cutters ride over the same. The draft appliance is shown generally in Fig. 1 as having side bars 42, connected loosely with the ends of the cutter-axle; but it is to be understood that this draft appliance may be constructed in any suitable way for hitching to a team of three horses, the latter adapted to walk in the spaces between the corn rows.

I employ a rake-clearer for partly removing the hay from the tines on the elevation of the rake mechanism. This clearer consists of a head 43, having a depending series of fingers 44, projecting through the spaces between the rake-tines, and to the ends of this clearer-head are fastened the links 45, which are connected pivotally to arm 46 on the side rails of the frame, whereby the clearer-head rests by gravity upon the tines of the rake.

The apparatus is provided with a transverse axle 47, having spindles 48, upon which are mounted supporting-wheels, whereby the rake may be properly supported, and when it is desired to use the cutter without the rake the lever 16 may be operated to raise the rake from its operative position.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described the invention, what I claim is—

1. The combination with a frame, of a rake-head pivotally mounted therein, a lever fixed to the head for operating it, a locking-bar adapted for engagement with the lever to hold it at different points of its adjustment, a foot-treadle pivoted adjacent to the locking-bar, and a stud carried by the treadle and engaging the locking-bar for moving it out of engagement with the lever.

2. The combination with a frame, of a rake-head pivoted therein, a lever fixed to the head for oscillating it, a notched locking-bar for engaging the lever to hold it at different points of its adjustment, said bar having pivotal connection with the frame, a treadle pivoted concentric with the bar, and a stud upon the treadle engaging the bar to move it out of engagement with the lever.

3. The combination with a frame, and a rake-head, of a lever provided with a slot and a locking-tongue, a notched locking-bar fitted loosely in the slot of said lever, and a foot-treadle disconnected from the locking-bar and having means for exerting pressure in an upward direction thereon, substantially as described.

4. A convertible hay-rake and stalk-cutter comprising a frame provided with supporting-wheels to support the frame, a rotatable cutter removably connected with the frame, draft appliances for alternate attachment to the frame and cutter respectively, and an adjustable rake mechanism upon the frame for adjustment into and out of operative position.

I testimony that I claim the foregoing as my own I have hereto affixed my signature in the presence of two witnesses.

WILLIAM C. ZICKEFOOSE.

Witnesses:
E. J. BOYNTON,
J. E. GIBSON.